United States Patent
Judge et al.

(10) Patent No.: US 7,161,894 B2
(45) Date of Patent: Jan. 9, 2007

(54) OPTICAL RECORDING ARTICLE

(75) Inventors: John S. Judge, Durham, NH (US);
Jiqun Shao, Newton, MA (US);
Warren W. Goller, Acton, MA (US)

(73) Assignee: Quantum Corporation, San Jose, CA (US)

( * ) Notice: Subject to any disclaimer, the term of this patent is extended or adjusted under 35 U.S.C. 154(b) by 783 days.

(21) Appl. No.: 09/888,093

(22) Filed: Jun. 21, 2001

(65) Prior Publication Data
US 2003/0016619 A1  Jan. 23, 2003

(51) Int. Cl.
*G11B 7/00* (2006.01)
(52) U.S. Cl. .................................... 369/287
(58) Field of Classification Search ................ 369/287, 369/93; 428/64.1, 64.4; 427/255.5
See application file for complete search history.

(56) References Cited

U.S. PATENT DOCUMENTS

| | | | |
|---|---|---|---|
| 4,581,729 A | 4/1986 | Beaujean | |
| 4,970,707 A * | 11/1990 | Hara et al. | 369/44.11 |
| 5,017,414 A * | 5/1991 | Gregg | 428/64.8 |
| 5,063,097 A | 11/1991 | Hirota et al. | |
| 5,098,761 A | 3/1992 | Watanabe et al. | |
| 5,124,232 A | 6/1992 | Nakanishi et al. | |
| 5,187,052 A | 2/1993 | Maeda et al. | |
| 5,362,538 A | 11/1994 | Ohbayashi et al. | |
| 5,382,463 A * | 1/1995 | Adkins et al. | 428/141 |
| 5,418,030 A | 5/1995 | Tominaga et al. | |
| 5,460,853 A * | 10/1995 | Hintz et al. | 427/255.5 |
| 5,468,593 A * | 11/1995 | Asai et al. | 430/273.1 |
| 5,552,237 A * | 9/1996 | Utsunomiya et al. | 428/824.5 |
| 5,617,405 A | 4/1997 | Victora et al. | |
| 5,695,866 A | 12/1997 | Watanabe et al. | |
| 5,725,943 A * | 3/1998 | Hirata et al. | 428/847.2 |
| 5,802,033 A | 9/1998 | Van Rosmalen | |
| 5,858,565 A * | 1/1999 | Victora et al. | 428/819.1 |
| 5,863,702 A | 1/1999 | Ohbayashi et al. | |
| 5,876,822 A * | 3/1999 | Zhou et al. | 428/64.1 |
| 5,888,680 A | 3/1999 | Ohbayashi et al. | |
| 5,989,671 A * | 11/1999 | Nakayama et al. | 428/823.1 |
| 6,040,066 A * | 3/2000 | Zhou et al. | 428/641 |
| 6,071,588 A | 6/2000 | Nobumasa et al. | |
| 6,127,049 A | 10/2000 | Zhou et al. | |
| 6,227,476 B1 * | 5/2001 | Morisada | 242/334.4 |
| 6,254,966 B1 * | 7/2001 | Kondo | 428/156 |
| 6,497,988 B1 * | 12/2002 | Tyan et al. | 430/270.13 |
| 6,507,540 B1 * | 1/2003 | Berg et al. | 369/13.13 |
| 6,597,397 B1 * | 7/2003 | Stephenson et al. | 348/231.99 |
| 6,638,594 B1 * | 10/2003 | Zhou | 428/64.4 |
| 6,869,655 B1 * | 3/2005 | Ono et al. | 428/64.1 |

FOREIGN PATENT DOCUMENTS

| | | |
|---|---|---|
| EP | 0 551 072 A1 | 7/1993 |
| WO | WO 99/24975 | 5/1999 |
| WO | WO 99/30317 | 6/1999 |

OTHER PUBLICATIONS

JP 05 250659 A, Sep. 28, 1993, abstract, Derwent Publ. Ltd. London, GB, XP002244021, 1 pg.

Khulbe, Pramod et al., "Crystallization and amorphization studies of a $Ge_2Sb_{2.3}Te_5$ thin-film sample under pulsed laser irradiation", *Applied Optics*, vol. 39, No. 14, (2000).

Ohta, Takeo et al., "Overwritable Phase-Change Optical Disk Recording", *IEEE Transactions On Magnetics*, vol. 34, No. 2, (1998).

* cited by examiner

*Primary Examiner*—Angel Castro
(74) *Attorney, Agent, or Firm*—Morrison & Foerster LLP

(57) ABSTRACT

Optical recording articles, such as tapes, and methods of making and using such articles are disclosed.

13 Claims, 4 Drawing Sheets

OPTICAL RECORDING ARTICLE

TECHNICAL FIELD

The invention relates to optical recording articles, such as tapes, and methods of making and using such articles.

BACKGROUND

Magnetic tapes can be used for information storage. Typically, writing, reading and erasing information from a magnetic tape involves manipulating the magnetization of particles contained on the tape such as, for example, by directly contacting the magnetic tape with a tape head. Generally, the tape head applies a magnetic field to the magnetic tape during writing and erasing, and the magnetic tape induces a current in the tape head during reading.

Disks can be used for information storage. Certain disks contain a material that changes crystalline state upon exposure to heat. Generally, writing information on and erasing information from such a disk involves exposing portions of the disk to an energy beam, such as a light beam. The energy interacts with the disk and is converted to heat, forming portions of the disk where the material has changed from a crystalline state to an amorphous state, or vice-versa. Usually, reading information from such a disk involves irradiating the disk with a low energy beam and measuring one or more properties of the reflected energy beam.

SUMMARY

The invention relates to optical recording articles, such as optical recording tapes, and methods of making and using such articles.

In one embodiment, the invention generally features an article that includes a substrate in the form of a tape and an optical recording material disposed over the substrate.

In another embodiment, the invention generally features an article that includes a substrate having a thickness of less than about one millimeter and an optical recording material disposed over the substrate.

In a further embodiment, the invention generally features a flexible article that includes a substrate and an optical recording material disposed over the substrate.

In still another embodiment, the invention generally features an article having an aspect ratio of at least about 1.5. The article includes a substrate and an optical recording material disposed over the substrate.

In yet another embodiment, the invention generally features an article that includes a substrate, an optical recording material, and a reflective material between the substrate and the optical recording material.

In one embodiment, the invention generally features an article that includes a substrate and a sputter deposited optical recording material disposed over the substrate.

In another embodiment, the invention generally features a system that includes two reels and a tape. The tape includes a substrate and an optical recording material. The tape is at least partially wound around at least one of the reels.

In a further embodiment, the invention generally features a method that includes sputter depositing an optical recording material on an article having a substrate in the shape of a tape.

In still a further embodiment, the invention generally features a method that includes sputter depositing an optical recording material on an article having a flexible substrate.

In yet another embodiment, the invention generally features a method that includes sputter depositing an optical recording material on an article having a substrate with a thickness of less than about one millimeter.

In one embodiment, the invention generally features a method that includes sputter depositing an optical recording material onto a reflective material that is disposed over a substrate.

In another embodiment, the invention generally features a method that includes writing information on a tape that includes a substrate and an optical recording material disposed over the substrate.

In another embodiment, the invention generally features a method that includes erasing information from a tape that includes a substrate and an optical recording material disposed over the substrate.

In one embodiment, the invention generally features a data storage tape that includes a substrate and a data storage layer disposed over the substrate. The data storage layer includes an optical recording material.

Embodiments of the above aspects of the invention can include one or more of the following.

The substrate can be formed of one or more polymers, such as, for example, polyethylene naphthalates, polyimides, polyaramids and combinations thereof.

The optical recording material can be an optical phase change material, such as, for example, a compound containing germanium, antimony and tellurium.

The optical recording material can be a magneto-optic material, such as a compound containing terbium, iron and cobalt.

Embodiments of the invention can provide high information density, high information content and/or long useful lifetimes relative to certain tapes that do not contain optical recording materials, such as optical phase change materials or magneto-optical materials.

Embodiments of the invention can provide high information content relative to certain disks, such as disks containing optical phase change material(s).

Embodiments of the invention can provide serial information storage.

Embodiments of the invention can provide methods in which an optical recording article, such as an optical recording tape, is prepared so that one or more (e.g., all) the layers in the article have sufficiently low stress so that relatively little, if any, buckling of the layer(s) occurs during fabrication and/or use of the article.

Features, objects and advantages of the invention are in the description, drawings and claims.

DETAILED DESCRIPTION

Figure 1:
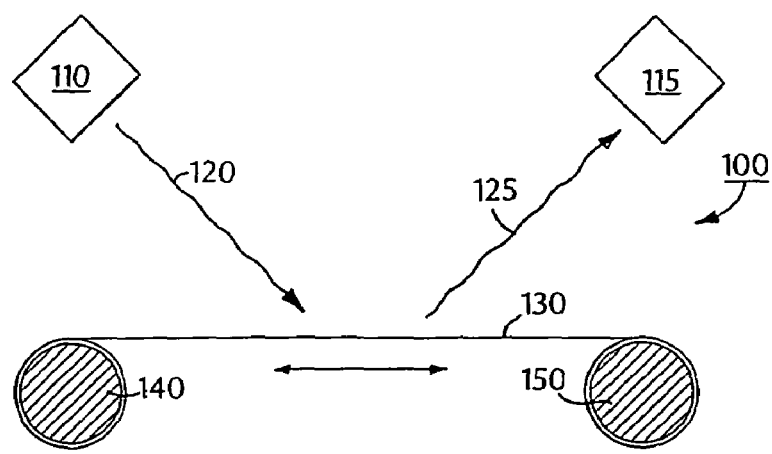
FIG. 1 is a schematic view of an embodiment of an information storage system.
Figure 2:
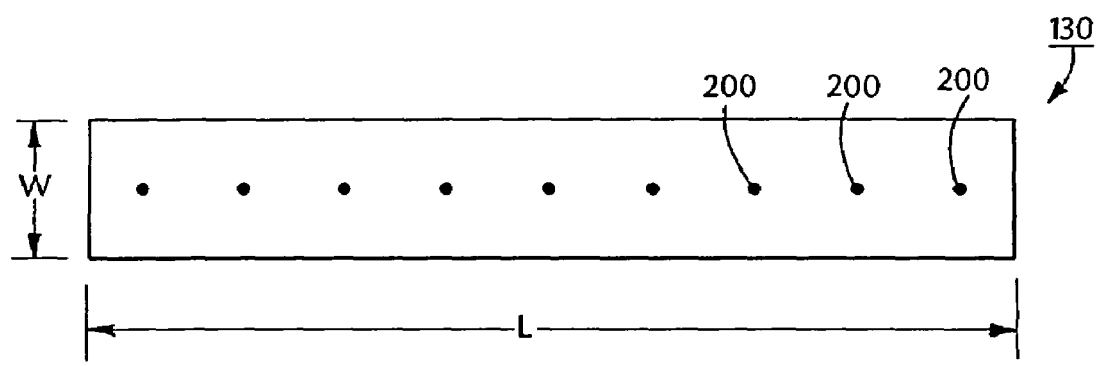
FIG. 2 is a schematic view of an embodiment of an information storage system.

FIG. 1 is a schematic view of an information storage system 100 designed to write, erase and/or read information from an article 130, such as a tape, that contains an optical phase change material as an optical recording material. An energy source 110 emits an energy beam 120 that irradiates article 130 as article 130 moves between reels 140 and 150. When writing information on article 130 or erasing information from article 130, the energy in beam 120 interacts with article 130 and is converted to heat, forming spots 200 on article 130 where the state of the optical phase change material has been changed from an amorphous state to a crystalline state, or vice-versa (FIG. 2). When reading information from article 130, a sensor 115 measures an energy beam 125 reflected by article 130 as energy beam 120 (typically having a lower energy than is used when writing or erasing) impinges on article 130. For example, sensor 115 can measure the power of energy beam 125.

Figure 3:
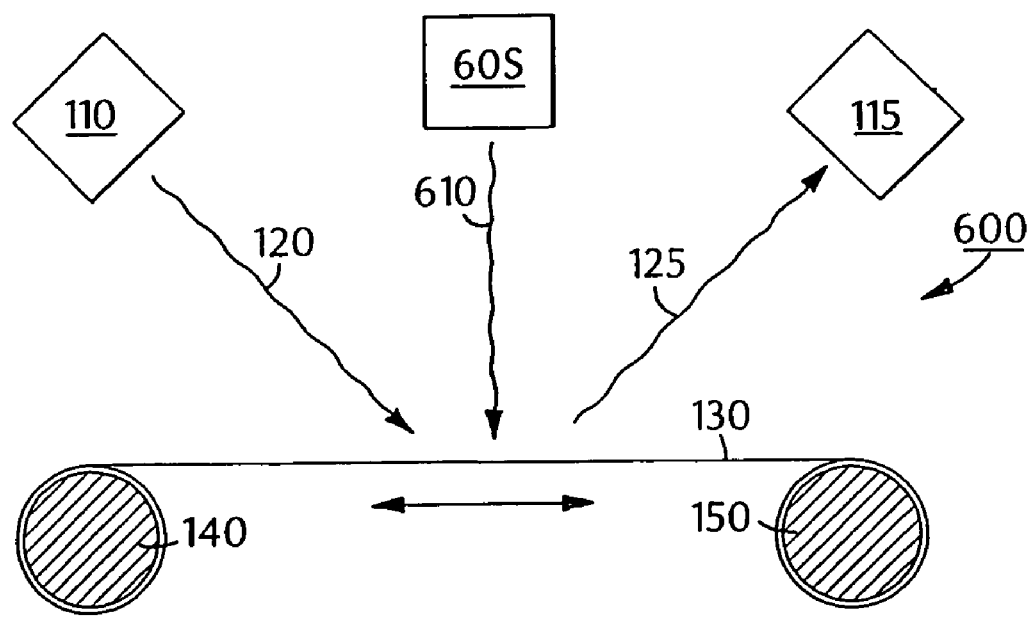
FIG. 3 is a plan view of an embodiment of an optical recording article.

FIG. 3 is a schematic view of an information storage system 600 designed to write, erase and/or read information from an article 130, such as a tape, that contains a magneto-optic material as an optical recording material. Energy source 110 emits energy beam 120 that irradiates article 130 as article 130 moves between reels 140 and 150. When writing information on article 130 or erasing information from article 130, the energy in beam 120 interacts with article and is converted to heat spots 200 on article 130 (FIG. 2). At the same time, a device 605 creates and exposes article 130 to a magnetic field 610. Magnetic field 610 can be, for example, a relatively low magnetic field, such as less than about 200 Oersteds (e.g., less than about 150 Oersteds, less than about 100 Oersteds). The simultaneous application of energy beam 120 and magnetic field 605 allows the magnetic state of the magneto-optic material at spots 200 to change. When reading information from article 130, sensor 115 is used to measure the polarization of energy beam 125 to measure the magnetic field of spots 200.

While certain methods of reading, writing and erasing information have been disclosed, other methods are also known. Such methods are contemplated.

Energy source 110 can be any energy source capable of emitting energy that can be used to write, erase and/or read information from article 130. Examples of such energy sources include strobo beams, halogen lamps, and lasers, such as a semiconductor lasers. The energy in beam 120 can have a single wavelength, or it can have more than one wavelength. For example, the energy in beam 120 can be formed of ultraviolet energy, infrared energy, visible light, or combinations thereof. In some embodiments, energy source 110 is a semiconductor laser, and energy beam 120 is formed of energy having a wavelength of about 660 nanometers. In certain embodiments, energy source 110 is a semiconductor laser, and energy beam 120 is formed of energy having a wavelength of about 830 nanometers.

Generally, the power of energy beam 120 varies depending upon whether system 100 is being used to write, erase or read information from article 130. In some embodiments, the power of energy beam 120 is from about 15 to about 17 milliWatts (e.g., about 16 milliWatts) when writing information on article 130, from about 11 milliWatts to about 13 milliWatts (e.g., about 12 milliWatts) when erasing information from article 130, and less than about two milliWatts (e.g., about one milliWatt) when reading information from article 130. In certain embodiments, the power of energy beam 120 is from about 15 to about 17 milliWatts (e.g., about 16 milliWatts) when erasing information from article 130, from about 11 milliWatts to about 13 milliWatts (e.g., about 12 milliWatts) when writing information on article 130, and less than about two milliWatts (e.g., about one milliwatt) when reading information from article 130.

Article 130 can be flexible enough to be easily wound around reels 140 and/or 150. In some embodiments, reels 140 and/or 150 can have a relatively small diameter, such as less than about 10 inches, less than about five inches, less than about three inches, or less than about one inch. In these embodiments, article 130 can be flexible enough to be wound and/or unwound around reels 140 and/or 150 without substantially changing the mechanical properties of article 130 (e.g., without substantial cracking of article 130) so that the ability to write, erase and/or read information from article 130 using system 100 is substantially unchanged by winding and/or unwinding article 130 around reels 140 and/or 150.

In certain embodiments, article 130 is in the shape of a tape. For example, article 130 can have a relatively high aspect ratio. The aspect ratio refers to the length (L) of article 130 to the width (W) of article 130. Typically, the aspect ratio of article 130 is greater than one. For example, the aspect ratio of article 130 can be greater than about 1.5, greater than about 10, greater than about 50, greater than about 100, or greater than about 1000.

Figure 4:
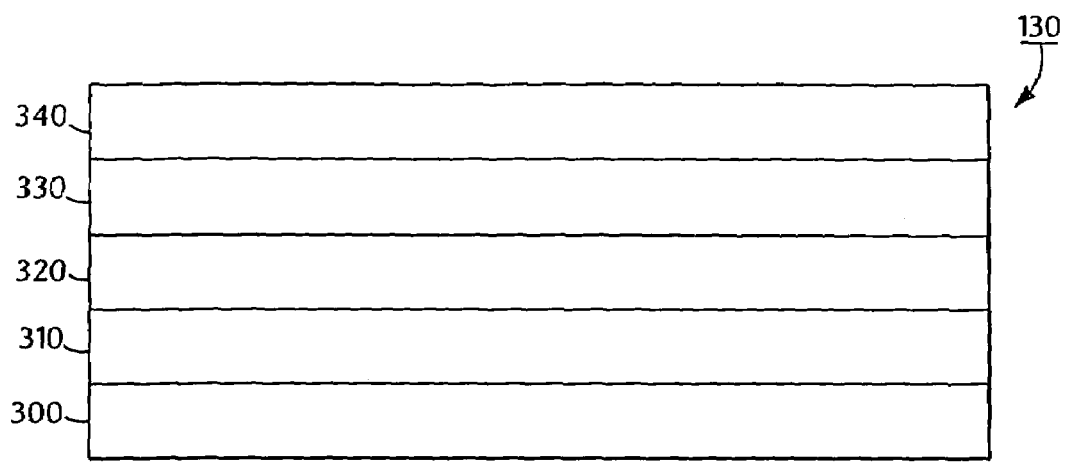
FIG. 4 is a cross-sectional view of an embodiment of an optical recording article.

FIG. 4 is a cross-sectional view of an embodiment of article 130 having layers 300, 310, 320, 330 and 340.

Layer 330 is formed of an optical recording material, such as an optical phase change material or a magneto-optic material. Typically, when layer 330 is formed of an optical phase change material, information is read from article 130 by measuring the power of energy beam 125 as article 130 is moved between reels 140 and 150.

Examples of optical phase change materials include $Au_2SeTe$, $AgGaTe_2$, $BaSb_2Zn$, $(AuSb)_2Te_3$, $Ag_8GeTe_5$, $Bi_2Ge$, $AuAgTe_2$, $AgIn_5Te_8$, $Bi_4GeTe_7$, $Ag_8SnSe_5$, $AgGaSe_2$, $Bi_4PbTe_7$, $AgSnSe_2$, $AgSbSe_2$, $BiPb_4Te_5$, $Ag_3AuTe_2$, $Ag_9GaSe_2$, $Bi_2Pb_2Se_5$, $AgSbTe_2$, $BaSb_2Se_4$, $Bi_4TeS_2$, $AgBiTe_2$, $Ba_2SnSe_4$, $BiGa_2Se_4$, $CuIn_5InTe_8$, $Ga_4GeSe_8$, $Bi_2SeTe_2$, $CuInTe_2$, $GaGeSe_3$, $As_3InSe_3$, $Cu_3SbSe_4$, $GaSe_6Ag_9$, $AsTlSe_2$, $CuAgSe$, $Ga_2PbSe_4$, $Tl_{14}SnSe$, $Cr_2P_2Se_6$, $GePtSe$, $AsGeSe$, $CsCu_8Se_6$, $ZnIn_2Te_4$, $AuCuTe_4$, $In_2MnTe_4$, $BiTlTe_2$, $Bi_2PbTe_4$, $In_3SbTe_2$, $CdIn_2Te_4$, $Bi_2PbSc_4$, $Mg_2Al_2Se_5$, $CdGa_2Se_4$, $Cu_2SnTe_3$, $MnGa_2Se_4$, $Cd_4GeSe_6$, $CuGeTe_3$, $NiSeTe$, $CdIn_2Se_4$, $Pb_3SbTe_4$, $CdTlSb$, $Pd_3In_4Sb_2$, $Tl_{12}Sn_2Se_5$, $Sb_2SeTe_4$, $Tl_2SnSe_3$, $Sb_2SnTe_4$, $Tl_2SnSe_3$, $CuAlS_2$, $TlCu_2Se_2$, $CuAlSe_2$, $AgAlS_2$, $CuAlTe_2$, $AgAlSe_2$, $CuGaS_2$, $AgAlTe_2$, $CuGaSe_2$, $AgGaS_2$, $CuGaTe_2$, $AgGaSe_2$, $CuInS_2$, $AgGaTe_2$, $CuInSe_2$, $MgSiP_2$, $CuInTe_2$, $MgSiAs_2$, $AgInS_2$, $MgSiSb_2$, $AgInSe_2$, $MgGeAs_2$, $AgInTe_2$, $MgGeSb_2$, $MgSnP_2$, $ZnSiP_2$, $MgSnAs_2$, $ZnSiAs_2$, $MgSnSb_2$, $ZnSiSb_2$, $ZnGeP_2$, $CdSiP_2$, $ZnGeAs_2$, $CdSiAs_2$, $ZnGeSb_2$, $CdSiSb_2$, $ZnSnP_2$, $CdGeP_2$, $ZnSnAs_2$, $CdGeAs_2$, $ZnSnSb_2$, $CdGeSb_2$, $CdSnP_2$, $CdSnAs_2$, $(Cu,Hg)_{12}Sb_4Se_{13}$, $(Ni,Pd)_2SbTe$, $Pd(Sb,Bi)Te$, $CuPbBiSe_3$, $CuCd_2GaSe_4$, $(Cu,Ga)CdSe_2$, $CuCd_2InSe_4$, $CuAl_4InSe_8$, $CuCdSiSe_4$, $CrCuSnSe_4$, $CuCoGeSe_4$, $Cu_2CoSnSe_4$, $CuZn_2GaSe_4$, $Cu_2FeGeSe_4$, $Cu_2FeSiSe_4$, $Cu_2FeSnSe_{3.8-4}$, $Cu_2MnGeSe_4$, $CuMnSiSe_4$, $CuMnSnSe_4$, $Cu_2HgSiSe_4$, $Cu_2NiGeSe_4$, $Cu_3FeTl_2Se_4$, $Cu_3Tl_2FeSe_4$, $CuZn_2InSe_4$, $Cu_2ZnSiSe_4$, $Ga_2InAsSe_3$, $AgAl_4InSe_8$, $PbBi2(Se,Te)4$, $AlNa3SiTe4$, $CuCd2GaTe4$, $CuGd2InTe4$, $AgCd_2InTe_4$, $CuZn_2GaTe_4$, $Cu_3FeTl_2Te_4$, $CuZn_2InTe_4$, $PdBi_2(Se,Te)_4$ and $AgInAl_4Te_8$. In certain embodiments, layer 330 is formed of an optical phase change material including germanium, antimony and tellurium. For example, layer 330 can be formed of a material having the empirical formula $Ge_xSb_yTe_z$. x can have a minimum value of about 0.1 and a maximum value of about two. y can have a minimum value of about 0.1 and a maximum value of about five. z can have a minimum value of about 0.1 and a maximum value of about 10. In some embodiments, layer 330 is formed of $Ge_1Sb_1Te_{1.3}$. In certain embodiments, layer 330 is formed of $Ge_1Sb_2Te_{2.3}$.

Examples of magneto-optical materials from which layer 330 can be formed include alloys of metals. Exemplary metals include platinum, tantalum, zirconium, molybdenum, ruthenium, rhodium, palladium, niobium, silver, tungsten, cobalt, titanium, vanadium, chromium, manganese, iron, nickel, copper, zinc, cerium, praseodymium, neodymium, promethium, samarium, europium, gadolinium, terbium, thulium, dysprosium, holmium. Examples of alloys include terbium, iron and cobalt containing alloys, terbium-iron-cobalt-chromium compounds, and cobalt-platinum alloys.

In some embodiments, layer 330 can have a minimum thickness of at least about one nanometer, at least about two nanometers, at least about five nanometers, at least about 10 nanometers or at least about 15 nanometers. The maximum thickness of layer 330 can be, for example, less than about 100 nanometers, less than about 50 nanometers, less than about 40 nanometers, less than about 30 nanometers, or less than about 35 nanometers. In certain embodiments, layer 330 is from about 18 nanometers to about 22 nanometers thick (e.g., about 20 nanometers thick). The thickness of layer 330, as well as layers 300, 310, 320 and/or 340, can be measured, for example, using an n&k Analyzer 1280 (n&k Technology, Inc., Santa Clara, Calif.).

Layer 300 is typically formed of a material appropriate for use as a substrate in article 130. Such materials can include, for example, glasses, metals (e.g., aluminum), and/or one or more polymers. Exemplary polymers include polycarbonates, polymethyl methacrylates, acrylic resins, polyolefin resins, epoxy resins, polyethylene terephthalates, polyethylene naphthalates, polyimides and polyaramids. In certain embodiments, such as when article 130 is formed using a sputter deposition process (discussed below), layer 300 is desirably formed of a material that can withstand being heated during the deposition process without undergoing substantial deformation (e.g., without substantial crinkling) so that information can subsequently be written, erased and/or read from article 130. In these embodiments, layer 300 can be formed, for example, of one or more polymers selected from polyethylene naphthalates, polyimides and polyaramids. Polyethylene naphthalates are commercially available from, for example, Teijin (Japan) under the tradename Teonex (e.g., 4.7 micrometers thick, six micrometers thick, or 5.2 micrometers thick). Polyaramids are commercially available from, for example, Toray (Japan) under the tradenames Palm and Normal Mictron (e.g., 4.4 micrometers thick) and Palm (e.g., 4.4 micrometers thick). Polyimides are commercially available from, for example, Toray (Japan) under the tradename Kapton (e.g., 12.5 micrometers thick).

In certain embodiments, layer 300 is relatively thin. For example, the thickness of layer 300 can be less than about one millimeter, less than about 500 microns, less than about 100 microns, less than about 50 microns, less than about 10 microns, from about two microns to about eight microns, or from about four microns to about six microns.

Layer 310 is formed of a material that can absorb heat and/or reflect energy at wavelengths that are about the same as the wavelength(s) of energy in beam 120. Examples of materials from which layer 310 can be formed include metals, such as zirconium, hafnium, titanium, tantalum, molybdenum, silicon, aluminum, gold, silver, copper, rhodium, platinum, palladium, nickel, cobalt, manganese, chromium and tungsten. Alloys of these metals can also be used. In some embodiments, layer 310 may additionally include zirconium oxide(s), silicon oxide(s), silicon nitride(s) and/or aluminum oxide(s). In certain embodiments, layer 310 is formed of a material containing aluminum and titanium.

In certain embodiments, layer 310 can have a minimum thickness of at least about one nanometer, at least about five nanometers, at least about 10 nanometers, at least about 20 nanometers or at least about 30 nanometers. The maximum thickness of layer 310 can be, for example, less than about 100 nanometers, less than about 80 nanometers, less than about 60 nanometers, less than about 50 nanometers, or less than about 45 nanometers. In certain embodiments, layer 310 is from about 38 nanometers to about 42 nanometers thick (e.g., about 40 nanometers thick).

Layers 320 and 340 can be formed of a material capable of absorbing heat (e.g., heat created as energy beam 120 irradiates article 130) and/or acting as an interference filter to enhance the difference in the reflectance of energy (e.g., light) from layer article 130 depending upon whether the optical recording material is in a particular phase (e.g., a crystalline phase or an amorphous phase) or depending upon the magnetic state of the optical recording material. Examples of materials from which layers 320 and 340 can be formed include zinc sulfides (e.g., ZnS), silicon oxides (e.g., $SiO_2$), germanium oxides, titanium oxides, zirconium oxides, tellurium oxides, aluminum oxides (e.g., $Al_2O_3$), tantalum oxides (e.g., $Ta_2O_5$), silicon nitrides (e.g., $Si_3N_4$), tantalum nitrides (e.g., TaN), zirconium nitrides (e.g., ZrN), aluminum nitrides (e.g., AlN), titanium nitrides (e.g., TiN), fluorides (e.g., SiF), materials containing mixtures of lanthanum, silicon, oxygen and nitrogen (LaSiON materials), compounds containing mixtures of silicon, aluminum, oxygen and nitrogen (SiAlON materials), and mixtures of these materials. In certain embodiments, layers 320 and/or 340 are formed of a mixture of zinc sulfide (e.g., ZnS) and silicon oxide (e.g., $SiO_2$), zinc sulfide (e.g., ZnS) and silicon nitride (e.g., $Si_3N_4$), or zinc sulfide (e.g., ZnS) and tantalum oxide (e.g., $Ta_2O_5$). In some embodiments, layers 320 and/or 340 are formed of zinc sulfide (e.g., ZnS) containing silicon oxide (e.g., $SiO_2$).

As known to those skilled in the art, the thickness of layers 320 and 340 can be selected based upon the wavelength of energy beam 120. For example, the thickness of layers 320 and/or 340 can be selected to optimize the difference in energy (e.g., light) reflected from layer 330 of optical recording material. The thickness of layers 320 and/or 340 can additionally or alternatively be selected to provide good heat absorbance.

In some embodiments, layer 320 can have a minimum thickness of at least about one nanometer, at least about two nanometers, at least about five nanometers, at least about 10 nanometers or at least about 15 nanometers. The maximum thickness of layer 320 can be, for example, less than about 100 nanometers, less than about 50 nanometers, less than about 40 nanometers, less than about 30 nanometers, or less than about 35 nanometers. In certain embodiments, layer 320 is from about 18 nanometers to about 22 nanometers thick (e.g., about 20 nanometers thick).

In certain embodiments, layer 340 can have a minimum thickness of at least about five nanometers, at least about 10 nanometers, at least about 25 nanometers, at least about 50 nanometers or at least about 70 nanometers. The maximum thickness of layer 340 can be, for example, less than about 200 nanometers, less than about 150 nanometers, less than about 100 nanometers, less than about 90 nanometers, or less than about 85 nanometers. In certain embodiments, layer 310 is from about 78 nanometers to about 82 nanometers thick (e.g., about 80 nanometers thick).

Article 130 can be prepared using a variety of standard techniques, including, for example, co-evaporation deposition, or sputtering deposition. In certain embodiments, combinations of these techniques can be used. For example, co-evaporation deposition can be used for forming certain layers, and sputtering deposition can be used for forming other layers. Typically, such techniques can be performed using one or more commercially available vacuum apparatus. In some embodiments, sputter deposition can be performed using a Nordiko 2550 vacuum sputter deposition apparatus.

Figure 5:
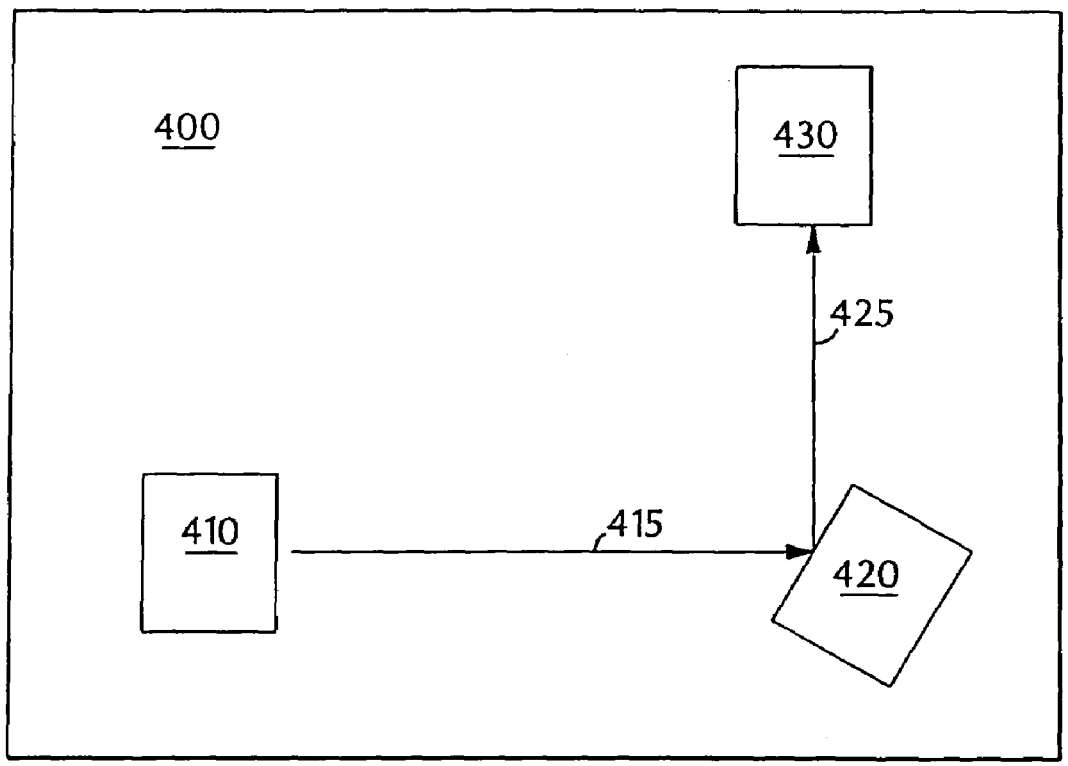
FIG. 5 is a schematic view of an embodiment of a deposition system.

FIG. 5 is a schematic diagram of an embodiment of a sputter deposition apparatus 400 that can be used to form one or more layers of article 130. Apparatus 400 includes an ion gun 410 (e.g., an argon ion gun). A beam of ions 415 emitted by gun 410 impinge upon starting material 420, sputtering the constituents of starting material 420. At least a portion 425 of the sputtered constituents impinge upon the surface of body 430, resulting in the growth of a material layer. In certain embodiments, article 130 is grown by a sequence of such sputtering steps, with each sputter deposited layer being formed from the sputtered constituents of a corresponding starting material.

In certain embodiments, article 130 can be prepared as follows. Substrate 300 is placed on body 430. A source for an aluminum-titanium material (e.g., $Al_aTi_b$, where a is from about 97.5 to about 99.5, such as about 98.5, and b is from about 0.5 to about 2.5, such as about 1.5) is used as starting material 420, and is sputtered to form layer 310. A source for $ZnS/SiO_2$ (e.g., a compound containing from about 15 mole percent $SiO_2$ to about 25 mole percent $SiO_2$, such as about 20 mole percent $SiO_2$, and from about 75 mole percent to about 85 mole percent ZnS, such as about 80 mole percent ZnS) is next used as starting material 420, and is sputtered to form layer 320. Then a source for an optical recording material (e.g., a germanium-antimony-tellurium compound, such as $Ge_2Sb_2Te_5$, $Ge_1Sb_2Te_{3.9}$, or a terbium-iron-chromium-cobalt compound, such as $Tb_{20.5}Fe_{69.5}Cr_3Co_7$) is used as starting material 420, and is sputtered to form layer 330. A source for $ZnS/SiO_2$ (e.g., a compound containing from about 15 mole percent $SiO_2$ to about 25 mole percent $SiO_2$, such as about 20 mole percent $SiO_2$, and from about 75 mole percent to about 85 mole percent ZnS, such as about 80 mole percent ZnS) is next used as starting material 420, and is sputtered to form layer 340.

In certain embodiments (e.g., when preparing an optical phase change tape), sputter deposition can be performed as follows. Layer 310 (e.g., an about 40 nanometer thick layer) can be sputter deposited using an argon pressure of from about five milliTorr to about 15 milliTorr (e.g., about 10 milliTorr), a voltage of from about 350 Volts to about 450 Volts (e.g., from about 400 Volts to about 420 Volts, such as about 410 Volts), a power of from about 150 Watts to about 250 Watts (e.g., from about 175 Watts to about 225 Watts, such as about 200 Watts) and a sputter time of from about 20 seconds to about 40 seconds (e.g., from about 25 seconds to about 40 seconds, such as about 34 seconds). Layer 320 (e.g., an about 20 nanometer thick layer) can be sputter deposited using an argon pressure of from about three milliTorr to about 10 milliTorr (e.g., about six milliTorr), a voltage of from about 350 Volts to about 450 Volts (e.g., from about 400 Volts to about 420 Volts, such as about 410 Volts), a power of from about 500 Watts to about 700 Watts (e.g., from about 550 Watts to about 650 Watts, such as about 600 Watts) and a sputter time of from about 30 seconds to about 60 seconds (e.g., from about 40 seconds to about 50 seconds, such as about 45 seconds). Layer 330 (e.g., an about 20 nanometer thick layer) can be sputter deposited using an argon pressure of from about three milliTorr to about seven milliTorr (e.g., about five milliTorr), a voltage of from about 300 Volts to about 500 Volts (e.g., from about 450 Volts to about 480 Volts, such as about 465 Volts), a power of from about 200 Watts to about 400 Watts (e.g., from about 250 Watts to about 350 Watts, such as about 300 Watts) and a sputter time of from about 30 seconds to about 70 seconds (e.g., from about 40 seconds to about 60 seconds, such as about 50 seconds). Layer 340 (e.g., an about 80 nanometer thick layer) can be sputter deposited using an argon pressure of from about three milliTorr to about 10 milliTorr (e.g., about six milliTorr), a voltage of from about 700 Volts to about 900 Volts (e.g., from about 750 Volts to about 850 Volts, such as about 790 Volts), a power of from about 500 Watts to about 700 Watts (e.g., from about 550 Watts to about 650 Watts, such as about 600 Watts) and a sputter time of from about nine minutes to about 12 minutes (e.g., from about 10 minutes and 30 seconds to about 11 minutes and 30 seconds, such as about 11 minutes).

In some embodiments (e.g., when preparing a magneto-optic tape), sputter deposition can be performed as follows. Layer 310 (e.g., an about 60 nanometer thick layer) can be sputter deposited using an argon pressure of from about five milliTorr to about 15 milliTorr (e.g., about 10 milliTorr), a power of from about 600 Watts to about 800 Watts (e.g., from about 650 Watts to about 750 Watts, such as about 700 Watts), and a sputter time of from about six minutes to about seven minutes (e.g., from about six minutes and 20 seconds to about seven minutes, such as about six minutes and 45 seconds). Layer 320 (e.g., an about 20 nanometer thick layer) can be sputter deposited using an argon pressure of from about two milliTorr to about six milliTorr (e.g., about four milliTorr), a power of from about 500 Watts to about 700 Watts (e.g., from about 550 Watts to about 650 Watts, such as about 600 Watts) and a sputter time of from about 11 minutes to about 13 minutes (e.g., from about 12 minutes and 20 seconds to about 13 minutes, such as about 12 minutes and 45 seconds). Layer 330 (e.g., an about 25 nanometer thick layer) can be sputter deposited using an argon pressure of from about three milliTorr to about seven milliTorr (e.g., about five milliTorr), a power of from about 300 Watts to about 500 Watts (e.g., from about 350 Watts to about 450 Watts, such as about 400 Watts) and a sputter time of from about three minutes to about four minutes (e.g., from about three minutes and 20 seconds to about three minutes and 50 seconds, such as about three minutes and 35 seconds). Layer 340 (e.g., an about 80 nanometer thick layer) can be sputter deposited using an argon pressure of from about two milliTorr to about six milliTorr (e.g., about four milliTorr), a power of from about 500 Watts to about 700 Watts (e.g., from about 550 Watts to about 650 Watts, such as about 600 Watts) and a sputter time of from about 40 minutes to 60 minutes (e.g., from about 50 minutes to about 55 minutes, such as about 51 minutes).

The following examples are illustrative only and not intended as limiting. The sputter deposition processes described in the following examples were performed using a Nordiko 2550 deposition apparatus. The base pressure of the apparatus was about 0.2 milliTorr. The information was written and read using a Milles-Griot (561MS001) laser using a wavelength of 660 nanometers. A power of about one milliWatt was used when reading information.

EXAMPLE I

An optical phase change tape was prepared as follows.

The substrate was an about 4.4 micron thick polyaramid material purchased from Toray (Japan) under the tradename Palm. An about 40 nanometer thick layer of an aluminum/titanium compound was sputter deposited onto the substrate using an argon pressure of about 10 milliTorr, a voltage of about 410 Volts, a power of about 200 Watts, and a sputter time of about four minutes and 34 seconds. The starting material was $Al_{98.5}Ti_{1.5}$ purchased from Nimtec, Inc. (Chandler, Ariz.).

An about 20 nanometer thick layer of $ZnS/SiO_2$ was sputter deposited onto the aluminum/titanium layer using an argon pressure of about six milliTorr, a voltage of about 410 Volts, a power of about 600 Watts, and a sputter time of about two minutes and 45 seconds. The starting material was a $ZnS/SiO_2$ compound containing about 20 mole percent $SiO_2$ purchased from Nimtec, Inc. (Chandler, Ariz.).

An about 20 nanometer thick layer of $Ge_1Sb_1Te_{1.3}$ was sputter deposited on the $ZnS/SiO_2$ layer using an argon pressure of about five milliTorr, a voltage of about 465 Volts, a power of about 300 Watts, and a sputter time of about 50 seconds. The starting material was $Ge_2Sb_2Te_5$ purchased from Nimtec, Inc. (Chandler, Ariz.).

An about 80 nanometer thick layer of ZnS/SiO2 was sputter deposited onto the $Ge_1Sb_1Te_{1.3}$ layer using an argon pressure of about six milliTorr, a voltage of about 790 Volts, a power of about 600 Watts, and a sputter time of about 11 minutes and 11 seconds. The starting material was a $ZnS/SiO_2$ compound containing about 20 mole percent $SiO_2$ purchased from Nimtec, Inc. (Chandler, Ariz.).

Information was written on, and subsequently read from, the optical phase change tape using the conditions listed in Table I. In Table I, "Power (mW)" corresponds to the power of the energy beam used to write on the optical phase change tape in units of milliWatts; "Pulse Width (µs)" corresponds to the duration the optical phase change tape was irradiated during writing by each pulse of the energy beam; "Pulse Interval (µs)" corresponds to the time period between energy pulses that irradiated the optical phase change tape during writing; "Tape Speed (ips)" corresponds to the speed the tape was moving in units of inches per second during writing; "Spot Size (µm)" corresponds to the size of the spot on the optical phase change tape created by a pulse of the energy during writing; and "Signal to Noise (dB)" corresponds to the log of the ratio of the signal read ($E_S$) from the optical phase change tape to the noise ($E_N$) as given by the equation:

$$S/N(dB) = 20\ log_{10}(E_S/E_N).$$

TABLE I

| Power (mW) | Pulse Width (µs) | Pulse Interval (µs) | Tape Speed (ips) | Spot Size (µm) | Signal to Noise (dB) |
|---|---|---|---|---|---|
| 16.8 | 1 | 5 | 100 | 3 | >28 |
| 16.8 | 1 | 5 | 50 | 3 | >28 |
| 9.8 | 1 | 5 | 100 | 2 | 27 |
| 6.4 | 1 | 5 | 100 | <1 | 27 |
| 21.4 | 0.5 | 5 | 50 | 1 | 16 |

EXAMPLE II

An optical phase change tape was prepared as follows.

The substrate was an about 4.4 micron thick polyaramid material purchased from Toray (Japan) under the tradename Palm. An about 40 nanometer thick layer of an aluminum/titanium compound was sputter deposited onto the substrate using an argon pressure of about 10 milliTorr, a voltage of about 410 Volts, a power of about 700 Watts, and a sputter time of about four minutes and 36 seconds. The starting material was $Al_{98.5}Ti_{1.5}$ purchased from Nimtec, Inc. (Chandler, Ariz.).

An about 20 nanometer thick layer of $ZnS/SiO_2$ was sputter deposited onto the aluminum/titanium layer using an argon pressure of about six milliTorr, a voltage of about 735 Volts, a power of about 600 Watts, and a sputter time of about two minutes and 48 seconds. The starting material was a $ZnS/SiO_2$ compound containing about 20 mole percent $SiO_2$ purchased from Nimtec, Inc. (Chandler, Ariz.).

An about 80 nanometer thick layer of $Ge_1Sb_1Te_{1.3}$ was sputter deposited on the $ZnS/SiO_2$ layer using an argon pressure of about five milliTorr, a voltage of about 465 Volts, a power of about 300 Watts, and a sputter time of about two minutes. The starting material was $Ge_2Sb_2Te_5$ purchased from Nimtec, Inc. (Chandler, Ariz.).

An about 80 nanometer thick layer of $ZnS/SiO_2$ was sputter deposited onto the $Ge_1Sb_1Te_{1.3}$ layer using an argon pressure of about five milliTorr, a voltage of about 765 Volts, a power of about 600 Watts, and a sputter time of about 11 minutes. The starting material was a $ZnS/SiO_2$ compound containing about 20 mole percent $SiO_2$ purchased from Nimtec, Inc. (Chandler, Ariz.).

Information was written on, and subsequently read from, the optical phase change tape using the conditions listed in Table II. The headings in the table correspond to the same parameters noted above with respect to Table I.

TABLE II

| Power (mW) | Pulse Width (µm) | Pulse Interval (µs) | Tape Speed (ips) | Spot Size (µm) | Signal to Noise (dB) |
|---|---|---|---|---|---|
| 21.4 | 0.5 | 5 | 50 | 1 | 16 |

EXAMPLE III

An optical phase change tape was prepared as follows.

The substrate was an about 5.2 micron thick polyethylene naphthalate material purchased from Teijin (Japan) under the tradename Teonex. An about 40 nanometer thick layer of an aluminum/titanium compound was sputter deposited onto the substrate using an argon pressure of about 10 milliTorr, a voltage of about 400 Volts, a power of about 700 Watts, and a sputter time of about 30 seconds. The starting material was $Al_{98.5}Ti_{1.5}$ purchased from Nimtec, Inc. (Chandler, Ariz.).

An about 20 nanometer thick layer of $ZnS/SiO_2$ was sputter deposited onto the aluminum/titanium layer using an argon pressure of about six milliTorr, a voltage of about 740 Volts, a power of about 600 Watts, and a sputter time of about two minutes and 48 seconds. The starting material was a $ZnS/SiO_2$ compound containing about 20 mole percent $SiO_2$ purchased from Nimtec, Inc. (Chandler, Ariz.).

An about 80 nanometer thick layer of $Ge_1Sb_2Te_{2.3}$ was sputter deposited on the $ZnS/SiO_2$ layer using an argon pressure of about five milliTorr, a voltage of about 460 Volts, a power of about 300 Watts, and a sputter time of about 30 seconds. The starting material was $Ge_1Sb_2Te_{3.9}$ purchased from Nimtec, Inc. (Chandler, Ariz.).

An about 80 nanometer thick layer of $ZnS/SiO_2$ was sputter deposited onto the $Ge_1Sb_2Te_{2.3}$ layer using an argon pressure of about five milliTorr, a voltage of about 630 Volts, a power of about 600 Watts, and a sputter time of about eight minutes and 24 seconds. The starting material was a $ZnS/SiO_2$ compound containing about 20 mole percent $SiO_2$ purchased from Nimtec, Inc. (Chandler, Ariz.).

Information was written on, and subsequently read from, the optical phase change tape using the conditions listed in Table III. The headings in the table correspond to the same parameters noted above with respect to Table I.

TABLE III

| Power (mW) | Pulse Width (µs) | Pulse Interval (µs) | Tape Speed (ips) | Spot Size (µm) | Signal to Noise (dB) |
| --- | --- | --- | --- | --- | --- |
| 6.4 | 1 | 5 | 100 | 1 | 26 |
| 9.8 | 1 | 5 | 100 | 2 | >28 |
| 16.8 | 1 | 5 | 100 | 3 | >28 |

EXAMPLE IV

An optical phase change tape was prepared as follows.

The substrate was an about 5.2 micron thick polyethylene naphthalate material purchased from Teijin (Japan) under the tradename Teonex. An about 40 nanometer thick layer of an aluminum/titanium compound was sputter deposited onto the substrate using an argon pressure of about 10 milliTorr, a voltage of about 600 Volts, a power of about 700 Watts, and a sputter time of about four minutes and 12 seconds. The starting material was $Al_{98.5}Ti_{1.5}$ purchased from Nimtec, Inc. (Chandler, Ariz.).

An about 20 nanometer thick layer of $ZnS/SiO_2$ was sputter deposited onto the aluminum/titanium layer using an argon pressure of about six milliTorr, a voltage of about 700 Volts, a power of about 600 Watts, and a sputter time of about two minutes and 49 seconds. The starting material was a $ZnS/SiO_2$ compound containing about 20 mole percent $SiO_2$ purchased from Nimtec, Inc. (Chandler, Ariz.).

An about 25 nanometer thick layer of $Ge_1Sb_2Te_{2.3}$ was sputter deposited on the $ZnS/SiO_2$ layer using an argon pressure of about five milliTorr, a voltage of about 460 Volts, a power of about 300 Watts, and a sputter time of about one minute. The starting material was $Ge_1Sb_2Te_{3.9}$ purchased from Nimtec, Inc. (Chandler, Ariz.).

An about 80 nanometer thick layer of $ZnS/SiO_2$ was sputter deposited onto the $Ge_1Sb_2Te_{2.3}$ layer using an argon pressure of about six milliTorr, a voltage of about 630 Volts, a power of about 600 Watts, and a sputter time of about 10 minutes and 58 seconds. The starting material was a $ZnS/SiO_2$ compound containing about 20 mole percent $SiO_2$ purchased from Nimtec, Inc. (Chandler, Ariz.).

EXAMPLE V

An optical phase change tape was prepared as follows.

The substrate was an about 4.4 micron thick polyaramid material purchased from Toray (Japan) under the tradename Palm. An about 40 nanometer thick layer of an aluminum/titanium compound was sputter deposited onto the substrate using an argon pressure of about 10 milliTorr, a voltage of about 400 Volts, a power of about 700 Watts, and a sputter time of about four minutes and 12 seconds. The starting material was $Al_{98.5}Ti_{1.5}$ purchased from Nimtec, Inc. (Chandler, Ariz.).

An about 20 nanometer thick layer of $ZnS/SiO_2$ was sputter deposited onto the aluminum/titanium layer using an argon pressure of about six milliTorr, a voltage of about 700 Volts, a power of about 600 Watts, and a sputter time of about two minutes and 48 seconds. The starting material was a $ZnS/SiO_2$ compound containing about 20 mole percent $SiO_2$ purchased from Nimtec, Inc. (Chandler, Ariz.).

An about 50 nanometer thick layer of $Ge_1Sb_2Te_{2.3}$ was sputter deposited on the $ZnS/SiO_2$ layer using an argon pressure of about five milliTorr, a voltage of about 460 Volts, a power of about 300 Watts, and a sputter time of about two minutes. The starting material was $Ge_1Sb_2Te_{3.9}$ purchased from Nimtec, Inc. (Chandler, Ariz.).

An about 80 nanometer thick layer of $ZnS/SiO_2$ was sputter deposited onto the $Ge_1Sb_2Te_{2.3}$ layer using an argon pressure of about five milliTorr, a voltage of about 630 Volts, a power of about 600 Watts, and a sputter time of about 11 minutes and 13 seconds. The starting material was a $ZnS/SiO_2$ compound containing about 20 mole percent $SiO_2$ purchased from Nimtec, Inc. (Chandler, Ariz.).

EXAMPLE VI

An optical phase change tape was prepared as follows.

The substrate was an about 4.4 micron thick polyaramid material purchased from Toray (Japan) under the tradename Palm. An about 40 nanometer thick layer of an aluminum/titanium compound was sputter deposited onto the substrate using an argon pressure of about 10 milliTorr, a voltage of about 400 Volts, a power of about 700 Watts, and a sputter time of about four minutes and 12 seconds. The starting material was $Al_{98.5}Ti_{1.5}$ purchased from Nimtec, Inc. (Chandler, Ariz.).

An about 20 nanometer thick layer of $ZnS/SiO_2$ was sputter deposited onto the aluminum/titanium layer using an argon pressure of about six milliTorr, a voltage of about 700 Volts, a power of about 600 Watts, and a sputter time of about two minutes and 52 seconds. The starting material was a $ZnS/SiO_2$ compound containing about 20 mole percent $SiO_2$ purchased from Nimtec, Inc. (Chandler, Ariz.).

An about 25 nanometer thick layer of $Ge_1Sb_2Te_{2.3}$ was sputter deposited on the $ZnS/SiO_2$ layer using an argon pressure of about five milliTorr, a voltage of about 460 Volts, a power of about 300 Watts, and a sputter time of about 58 seconds. The starting material was $Ge_1Sb_2Te_{3.9}$ purchased from Nimtec, Inc. (Chandler, Ariz.).

An about 80 nanometer thick layer of $ZnS/SiO_2$ was sputter deposited onto the $Ge_1Sb_2Te_{2.3}$ layer using an argon pressure of about six milliTorr, a voltage of about 630 Volts, a power of about 600 Watts, and a sputter time of about 11 minutes and 12 seconds. The starting material was a $ZnS/SiO_2$ compound containing about 20 mole percent $SiO_2$ purchased from Nimtec, Inc. (Chandler, Ariz.).

EXAMPLE VII

A magneto-optic tape was prepared as follows.

The substrate was an about 4.4 micron thick polyaramid material purchased from Toray (Japan) under the tradename Palm. An about 60 nanometer thick layer of an aluminum/titanium compound was sputter deposited onto the substrate using an argon pressure of about 10 milliTorr, a power of about 700 Watts, and a sputter time of about six minutes and 48 seconds. The starting material was $Al_{98.5}Ti_{1.5}$ purchased from Nimtec, Inc. (Chandler, Ariz.).

An about 20 nanometer thick layer of silicon nitride was sputter deposited onto the aluminum/titanium layer using a nitrogen pressure of about four milliTorr, a power of about 600 Watts, and a sputter time of about 12 minutes and 48 seconds. The starting material was silicon doped with boron to a resistivity of from about 0.005 to 0.02 Ohm-centimeters purchased from MRC (Orangeburgh, N.Y.).

An about 25 nanometer thick layer of a terbium-iron-cobalt-chromium compound was sputter deposited on the silicon nitride layer using an argon pressure of about five milliTorr, a power of about 400 Watts, and a sputter time of about three minutes and 36 seconds. The starting material was $Tb_{20.5}Fe_{69.5}Cr_3Co_7$ purchased from MRC (Orangeburgh, N.Y.).

An about 80 nanometer thick layer of silicon nitride was sputter deposited onto the layer of the terbium-iron-cobalt-chromium compound using a nitrogen pressure of about four milliTorr, a power of about 600 Watts, and a sputter time of about 51 minutes. The starting material was silicon doped with boron to a resistivity of from about 0.005 to 0.02 Ohm-centimeters purchased from MRC (Orangeburgh, N.Y.).

EXAMPLE VIII

A magneto-optic tape was prepared as follows.

The substrate was an about 4.4 micron thick polyaramid material purchased from Toray (Japan) under the tradename Palm. An about 60 nanometer thick layer of an aluminum/titanium compound was sputter deposited onto the substrate using an argon pressure of about 10 milliTorr, a power of about 700 Watts, and a sputter time of about six minutes and 12 seconds. The starting material was silicon doped with boron to a resistivity of from about 0.005 to 0.02 Ohm-centimeters purchased from MRC (Orangeburgh, N.Y.).

An about 20 nanometer thick layer of silicon nitride was sputter deposited onto the aluminum/titanium layer using a nitrogen pressure of about four milliTorr, a power of about 600 Watts, and a sputter time of about 12 minutes and 48 seconds. The starting material was silicon doped with boron to a resistivity of from about 0.005 to 0.02 Ohm-centimeters purchased from MRC (Orangeburgh, N.Y.).

An about 25 nanometer thick layer of a terbium-iron-cobalt-chromium compound was sputter deposited on the silicon nitride layer using an argon pressure of about five milliTorr, a power of about 400 Watts, and a sputter time of about three minutes and 36 seconds. The starting material was $Tb_{20.5}Fe_{69.5}Cr_3Co_7$ purchased from MRC (Orangeburgh, N.Y.).

An about 80 nanometer thick layer of silicon nitride was sputter deposited onto the layer of the terbium-iron-cobalt-chromium compound using a nitrogen pressure of about four milliTorr, a power of about 600 Watts, and a sputter time of about 51 minutes. The starting material was silicon doped with boron to a resistivity of from about 0.005 to 0.02 Ohm-centimeters MRC (Orangeburgh, N.Y.).

While certain embodiments of the invention have been disclosed herein, the invention is not limited to these embodiments. For example, while a certain order of layers in an optical recording article, such as an optical phase change tape or a magneto-optic tape, have been disclosed herein, the invention is not limited to such embodiments. Other layer orderings are also contemplated. Moreover, additional layers, such as adhesion layers, mechanical support layers, compatibility layers, and the like, can also be added to or substituted in an optical recording article, such as an optical phase change tape or a magneto-optic tape.

Other embodiments are in the claims.

The invention claimed is:

1. An optical phase change tape, comprising, in this order:
a substrate comprising a polyaramid material;
a first heat absorbing layer comprising zinc sulfide and silicon oxide;
an optical recording layer comprising germanium, antimony, and tellurium; and
a second heat absorbing layer comprising zinc sulfide and silicon oxide,
wherein the optical recording layer is $Ge_1Sb_1Te_{1.3}$.

2. The optical phase change tape of claim 1, wherein the optical recording layer is about 20 nanometers thick.

3. The optical phase change tape of claim 1, wherein the substrate is about 4.4 microns thick.

4. The optical phase change tape of claim 1, further comprising a reflective layer disposed between the substrate and the first heat absorbing layer, wherein the reflective layer is about 40 nanometers thick.

5. The optical phase change tape of claim 1, wherein the first heat absorbing layer is about 20 nanometers thick.

6. The optical phase change tape of claim 1, wherein the second heat absorbing layer is about 80 nanometers thick.

7. The optical phase change tape of claim 1, wherein the optical recording layer is about 80 nanometers thick.

8. The optical phase change tape of claim 1, wherein the substrate is about 5.2 microns thick.

9. The optical phase change tape of claim 1, wherein the substrate comprises a polyethylene naphthalate material.

10. An optical phase change tape, comprising, in this order:
a substrate comprising a polyaramid material;
a first heat absorbing layer comprising zinc sulfide and silicon oxide;
an optical recording layer comprising germanium, antimony, and tellurium; and
a second heat absorbing layer comprising zinc sulfide and silicon oxide,
wherein the optical recording layer is $Ge_1Sb_1Te_{2.3}$.

11. The optical phase change tape of claim 10, wherein the optical recording layer is about 50 nanometers thick.

12. The optical phase change tape of claim 10, further comprising a reflective layer disposed between the substrate and the first heat absorbing layer.

13. The optical phase change tape of claim 12, wherein the reflective layer comprises aluminum and titanium.

* * * * *